United States Patent
Kairali et al.

(10) Patent No.: US 12,511,284 B2
(45) Date of Patent: Dec. 30, 2025

(54) DISTRIBUTED QUERY OPTIMIZATION

(71) Applicant: International Business Machines Corporation, Armonk, NY (US)

(72) Inventors: Sudheesh S. Kairali, Kozhikode (IN); Binoy Thomas, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/244,472

(22) Filed: Sep. 11, 2023

(65) Prior Publication Data

US 2025/0086172 A1  Mar. 13, 2025

(51) Int. Cl.
  *G06F 16/2453* (2019.01)
  *G06F 16/2455* (2019.01)
  *G06F 16/2458* (2019.01)

(52) U.S. Cl.
  CPC .. *G06F 16/24534* (2019.01); *G06F 16/24552* (2019.01); *G06F 16/2471* (2019.01)

(58) Field of Classification Search
  CPC .......... G06F 16/24534; G06F 16/2471; G06F 16/24552
  See application file for complete search history.

(56) References Cited

U.S. PATENT DOCUMENTS

| | | | |
|---|---|---|---|
| 5,978,841 A | 11/1999 | Berger | |
| 7,668,807 B2 | 2/2010 | Dettinger et al. | |
| 8,103,656 B2 | 1/2012 | Krishnamoorthy et al. | |
| 8,732,160 B2 | 5/2014 | Olston | |
| 11,144,548 B2 | 10/2021 | Shiran et al. | |
| 2014/0101135 A1* | 4/2014 | Yousaf | G06F 16/9535 707/E17.082 |
| 2015/0032486 A1* | 1/2015 | Francois | G06Q 10/02 705/5 |
| 2015/0254294 A1* | 9/2015 | Marais | G06F 16/275 707/690 |
| 2017/0316321 A1* | 11/2017 | Whitney | G06F 16/9574 |

(Continued)

OTHER PUBLICATIONS

Boicea, A., et al., "Improving Query Performance in Distributed Database", Control Engineering and Applied Informatics (CEAI), Jun. 2016, pp. 57-64, vol. 18, No. 2.

(Continued)

*Primary Examiner* — Tony Wu
(74) *Attorney, Agent, or Firm* — Scully, Scott, Murphy & Presser, P.C.; Lily Neff

(57) ABSTRACT

Distributed queries are analyzed to identify repeated queries. Pattern of the repeated queries is learned, where the pattern provides information associated with at least availability of data sources used for responding to the repeated queries and response times of the data sources. For a data source in the data sources, a time window during which the data source has a response time that is slower than a response time criterion is determined; prior to beginning of the time window, data is prefetched from the data source and storing the data in a cache storage; responsive to receiving a distributed query that uses the data source during the time window, the data is fetched from the cache storage, where at least a part of a response to the distributed query is sourced from the cache storage; and after end of the time window, the data is removed from the cache storage.

20 Claims, 4 Drawing Sheets

(56) References Cited

U.S. PATENT DOCUMENTS

| | | | |
|---|---|---|---|
| 2018/0075103 A1* | 3/2018 | Kogan | G06F 16/2455 |
| 2018/0121529 A1* | 5/2018 | Asadi | G06F 16/2471 |
| 2019/0108248 A1 | 4/2019 | Rajan et al. | |
| 2020/0242670 A1* | 7/2020 | Thye | H04L 47/822 |

OTHER PUBLICATIONS

Bonnet, P., et al., "Partial Answers for Unavailable Data Sources", Andreasen, T., Christiansen, H., Larsen, H.L. (eds) Flexible Query Answering Systems, FQAS 1998, Lecture Notes in Computer Science, 1998, 12 pages, vol. 1495.

Hassan, A., et al., "Beyond Clicks: Query Reformulation as a Predictor of Search Satisfaction", CIKM'13, Oct. 27-Nov. 1, 2013, 10 pages.

Rodhe, P.D., et al., "Optimizing Federated Queries Based on the Physical Design of a Data Lake", arXiv:2002.08102v1 [cs.DB], Feb. 19, 2020, 9 pages.

Tang, M., et al., "LocationSpark: In-memory Distributed Spatial Query Processing and Optimization", Accepted Aug. 5, 2020, Published Oct. 16, 2020, 15 pages, vol. 3, Article 30.

IBM. "What is a data lake?", retrieved from web https://web.archive.org/web/20211130021209/https://www.IBM.com/in-en/analytics/data-lake, Nov. 30, 2021, 10 pages.

\* cited by examiner

DISTRIBUTED QUERY OPTIMIZATION

BACKGROUND

The present application relates generally to computers and computer applications, and more particularly to distributed query optimization.

BRIEF SUMMARY

The summary of the disclosure is given to aid understanding of a computer system and method of distributed query optimization, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

In some embodiments, a computer-implemented method includes analyzing distributed queries to identify repeated queries. The computer-implemented method also includes learning a pattern of the repeated queries, the pattern providing information associated with at least availability of data sources used for responding to the repeated queries and response times of the data sources. The computer-implemented method also includes, for a data source in the data sources, determining a time window during which the data source has a response time that is slower than a response time criterion, and prior to beginning of the time window, prefetching data from the data source and storing the data in a cache storage. The computer-implemented method also includes, for a data source in the data sources, responsive to receiving a distributed query that uses the data source during the time window, fetching the data from the cache storage, where at least a part of a response to the distributed query is sourced from the cache storage, and after end of the time window, removing the data from the cache storage.

A system in some embodiments includes at least one computer processor. The system also includes at least one memory device coupled with the at least one computer processor. The at least one computer processor is configured to analyze distributed queries to identify repeated queries. The at least one computer processor is also configured to learn a pattern of the repeated queries, the pattern providing information associated with at least availability of data sources used for responding to the repeated queries and response times of the data sources. The at least one computer processor is also configured to, for a data source in the data sources, determine a time window during which the data source has a response time that is slower than a response time criterion, and prior to beginning of the time window, prefetch data from the data source and storing the data in a cache storage. The at least one computer processor is also configured to, for the data source in the data sources, responsive to receiving a distributed query that uses the data source during the time window, fetch the data from the cache storage, where at least a part of a response to the distributed query is sourced from the cache storage, and after end of the time window, remove the data from the cache storage.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
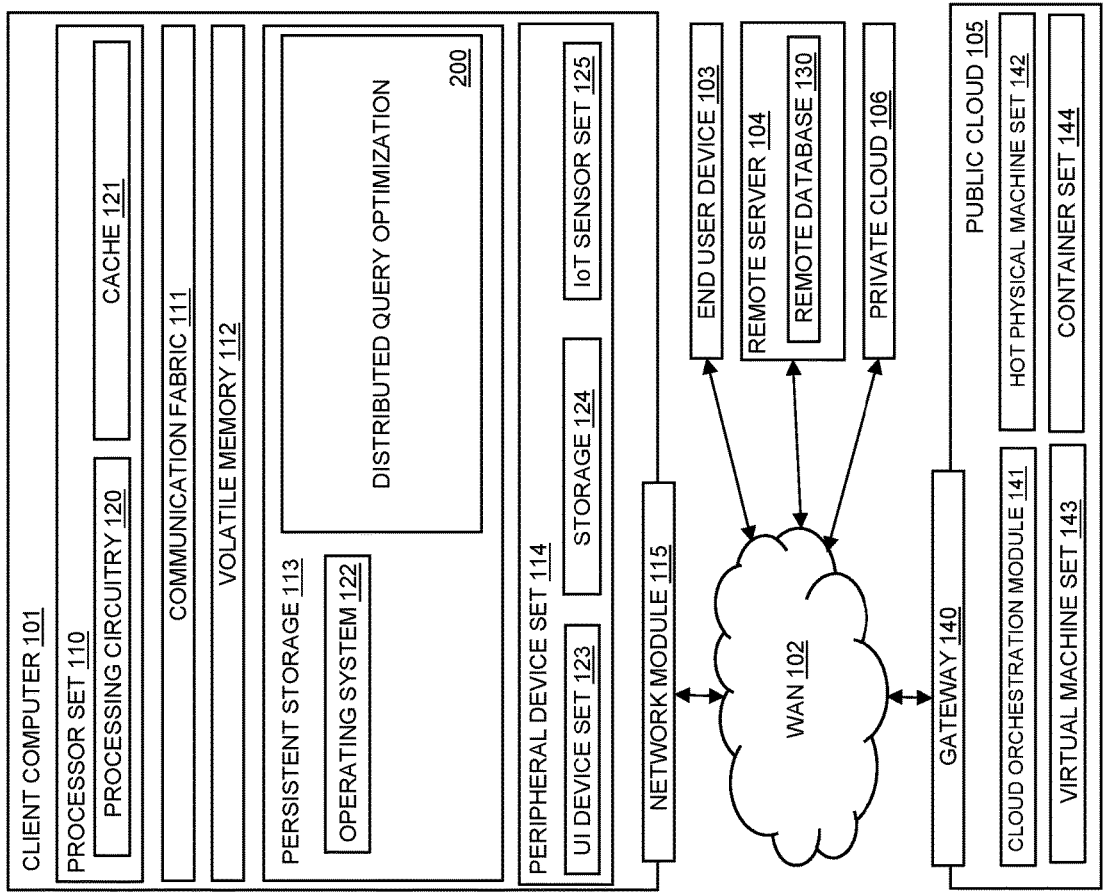
FIG. 1 shows an example of a computing environment, which can implement distributed query optimization in an embodiment.

In some embodiments, a computer-implemented method includes analyzing distributed queries to identify repeated queries. The computer-implemented method also includes learning a pattern of the repeated queries, the pattern providing information associated with at least availability of data sources used for responding to the repeated queries and response times of the data sources. The computer-implemented method also includes, for a data source in the data sources, determining a time window during which the data source has a response time that is slower than a response time criterion; prior to beginning of the time window, prefetching data from the data source and storing the data in a cache storage; responsive to receiving a distributed query that uses the data source during the time window, fetching the data from the cache storage, where at least a part of a response to the distributed query is sourced from the cache storage; and after end of the time window, removing the data from the cache storage.

In this way, e.g., data that is used for queries can be cached to a storage, where during the time when the data source of that data is slow in responding or is not available, the cached data can be used for responding to the query.

One or more of the following features can be separable or optional from each other. In some embodiments, the determining of the time window, the prefetching of the data, the fetching of the data, and the removing of the data are performed for all of the data sources. In this way, e.g., all data sources that are affected can have corresponding cache storages from which data for responding to queries can be used.

In some embodiments, the computer-implemented method further includes updating the time window based on new distributed queries. In this way, e.g., cache storage can be updated to store data that is affected by up-to-date query patterns.

In some embodiments, the computer-implemented method further includes updating the time window based on periodic availability checks of the data source. In this way, e.g., cache storage can be updated to store data that is affected by up-to-date data source information.

In some embodiments, the computer-implemented method further includes providing a user interface via which the data source can be marked as being time limited, where responsive to receiving a distributed query that uses the data source, sending a notification to a submitter of the distributed query to adjust a time of query submission. In this way, e.g., further up-to-date information from users about data sources can be used and also to notify querying users of timing of query responses, e.g., possible delays in responses the querying users may encounter and/or possibly avoiding delays by adjusting their query submission times.

In some embodiments, the computer-implemented method further includes transforming a parallel distributed query into a sequential distributed query, where at least some parts of the distributed query are performed with a delay, and responses to all parts of the distributed query are joined after the responses are received. In this way, e.g., potential retries of queries and/or time-outs can be mitigated.

In some embodiments, the computer-implemented method further includes providing a reason for the response time of the data source. In this way, e.g., explanation as to why some queries take certain duration or amount of time may be given.

A system including at least one computer processor and at least one memory device coupled with the at least one computer processor is also disclosed, where the at least one computer processor is configured to perform one or more methods described above. A computer program product is also disclosed that includes a computer readable storage medium having program instructions embodied therewith, where the program instructions are readable by a device to cause the device to perform one or more methods described above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as distributed query optimization algorithm code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated. PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A distributed structured query language (SQL) query engine allows for querying data from a variety of data sources such as a software framework for distributed storage, cloud object storage, non-relational database (e.g., NoSQL), relational database management system that employs SQL (e.g., MySQL), and more, or data from multiple data sources within a single query. Available query engines can be used for querying such data sources. So, for example, a distributed query refers to a query that can be split into multiple parts where different parts are queried from different sources or data sources. Results from the multiple sources are put together and returned as a result to that distributed query.

Different database servers and sources can manage multiple databases, which can be referenced in a single distributed query. For instance, it is possible that source 1, source 2, source 3 . . . , source N are serving a distributed query. If one or more sources are slower in responding than other sources used in the distributed query, the entire query can be slowed down. In some cases one or more sources may not be available at all or can get timed out. Slow or unavailable data sources can result in, not only is the distributed query getting slowed down but also, inability to fetch the needed data from one or more of those sources.

In various embodiments, systems, methods and/or techniques are presented that allow for an ability in distributed data management systems such as data Lakehouse managements systems to analyze or look for queries (e.g., distributed queries) that are repeatedly hitting, learn about the availability of data sources, identify patterns of hit and availability, and build a correlation to optimize or mitigate distributed query failures.

Figure 2:
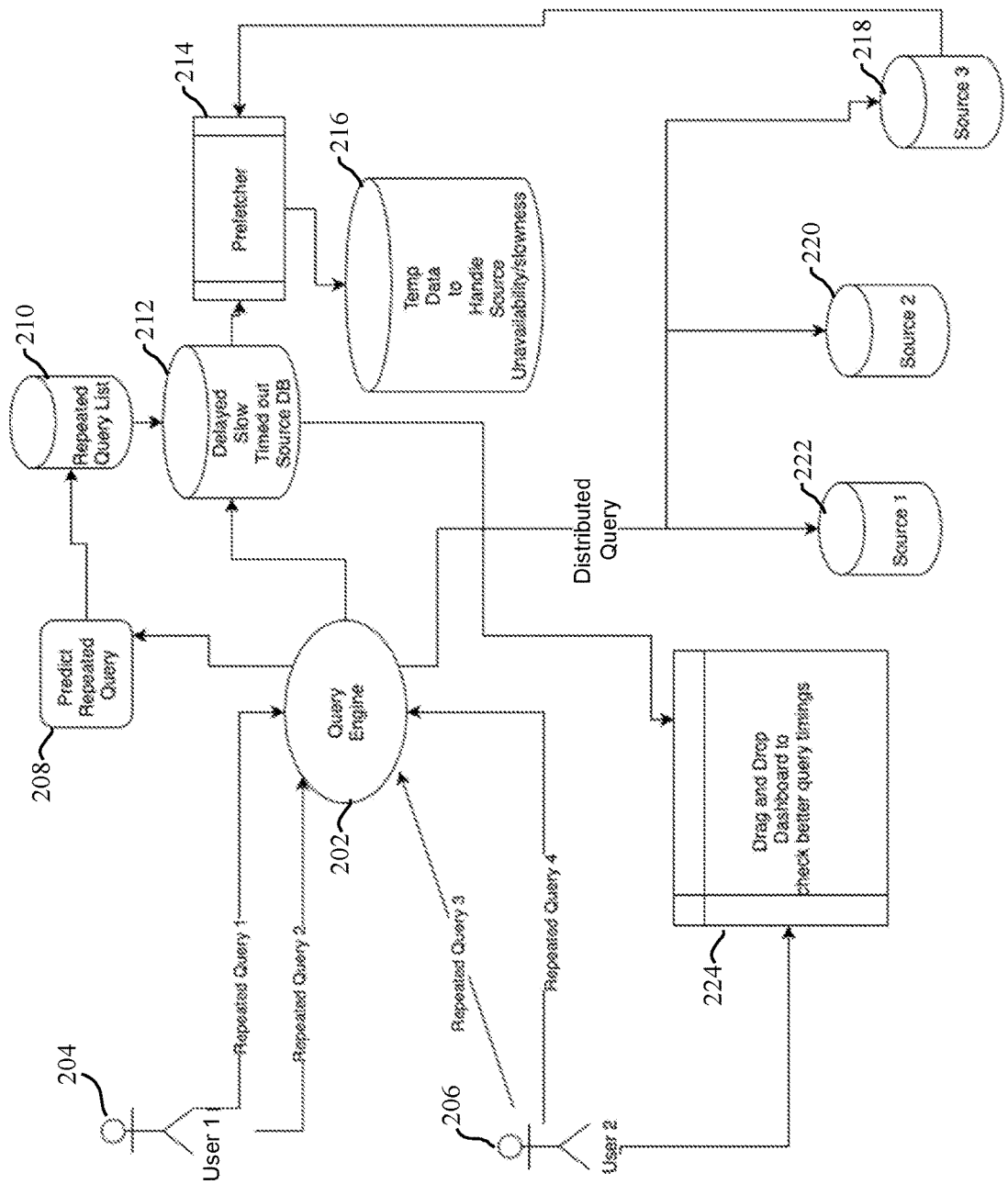
FIG. 2 is a diagram illustrating distributed query optimization in some embodiments.

FIG. 2 is a diagram illustrating distributed query optimization in some embodiments. A computer-implemented method and/or a system that includes at least one computer processor can perform the distributed query optimization. For instance, a computer processor identifies the regular queries and also the data sources and their availability and prepares a learning by which a computer processor can predict whether a query will land on a time when all necessary sources are available. A computer processor also minimizes the distributed query impacts due to predictable unavailability or slowness of sources. A computer processor also marks sources as time limited and allows administrators or other users to optimize the query timing. A computer processor also provides for parallel to sequential read adjustments in distributed queries. For instance, when all sources are not available in parallel, a processor may adjust the distributed query to a sequential query.

Queries can be received by a computer processor implementing a query engine 202 or like functionality, for example, via a browser or an application of a data management system or tool. For instance, one or more users 204, 206 may request queries. Some of the queries can be repetitive or repeat. For example, there can be queries that are similar or the same, and need access to the same data sources. Query engine 202 searches data sources 218, 220, 222, to provide a search result to one or more users, e.g., 204, 206.

A computer processor also analyzes the queries received at the query engine 202, and learns to recognize queries that repeat. For example, based on analyzing the received queries, a computer processor learns to predict repeat queries at 208. The predicted repeated queries can be stored in a data store or database 210, e.g., on a data storage device. A processor also identifies data sources that those repeated queries access, which tend to have delayed response time, are slow, and/or have time-out, for example, based on historical data. In an aspect, one or more known machine learning algorithms can be employed to predict such data sources. Those data sources (by way of example, shown at 218) can be listed in a data store or database 212, e.g., on a data storage device. For example, a list that includes those data sources are stored.

A processor, for example, prefetches, for example shown at 214, data associated with the repeated queries from those data sources identified or predicted as having delayed response time, are slow, and/or have time-out. Prefetched data can be stored in a storage 216, e.g., data store or database, e.g., on a data storage device.

In some embodiments, a processor, for example, implementing query engine 202, responsive to receiving a query may identify that one or more parts of the query needs to access one or more of data sources 212 determined to be slow, timed-out, or the like, for providing a result to the query. In such a case, data can be fetched from a storage 216 storing temporary or cached data, for providing such a result to the query. In some embodiments, a dashboard or like user interface 224 can be provided, via which a user (e.g., 206) may update or provide feedback as to the query timing, e.g., whether the results to the query were provided within a reasonable amount of time and without timing out.

As described above, in some embodiments, a method and/or system identifies the regular queries and also the sources and their availability, and prepares a learning by which a processor of a system can predict whether a query will land on a time when all needed sources are available. For example, a processor keeps recording the timed-out sources in distributed queries it receives, for example, each distributed query. A processor also keeps track of the queries that are slower than all other queries. The queries that are slower can be determined based on a threshold, such as a query that is slower than 80% of other queries. Other criterion or criteria can be used to determine whether a query is slow. A processor also taps into regular availability checks of sources as well as the heartbeat kind of verification. A processor identifies the set of queries that are slowed down regularly due to the sources (e.g., slowed down repeatedly and the kind of query that is hitting these sources). Using a learning technique such as reinforcement learning, a processor can determine or identify the cause of slower queries, for example, as being due to network delay, size of the data being too large, e.g., by correlating the delay and the data size with other queries.

As described above, in some embodiments, a method and/or system minimizes the distributed query impacts due to predictable unavailability or slowness of sources. For example, a processor checks and prepares a list of sources and time, where the time can be a time of the day, day of the week, and/or the like, which affects N number of queries, where N can be set (e.g., predefined or preconfigured) as a threshold. For all the regular and predicted queries that are hitting such sources, a processor prepares an impacted window of time (e.g., the most impacted window of time), prefetches the data from those sources before that impacted window of time, and saves the prefetched data in a storage device, e.g., in an optimization cache, which acts as a representative of the source for that impacted window of time. For example, shown at 214, a processor performing a prefetch function (e.g., referred to as a prefetcher) prefetches data from data source 218 to a storage 216 that stores cached or temporary data. Storage shown at 216 is also referred to as a cache storage.

In some embodiments, the timing of the prefetching can be predefined. For instance, prefetch can be set to be performed one or more hours before the impacted window or time, a day before the impacted window of time, or another time. The next time a query hits with predicted parameters for predicted sources, a processor fetches the data from the storage device, e.g., the cache. In some embodiments, after the impacted window of time is over, a processor cleans the cache or storage, for example, removes the stored data from the cache. In some embodiments, a processor corrects or updates the impacted window of time based on availability checks of sources, and any new queries that are hitting source at impacted window of times, which is successfully yielding the results in an acceptable time.

In some embodiments, a processor marks sources as time limited and allows administrators or users to optimize the query timing. For example, if a source is unavailable for a number of, or a percentage of (e.g., 90%, a threshold that can be set, e.g., by an administrator or another) of predictable queries, a processor may mark such sources as time limited, and for all queries such sources are only used during the time limited period where the sources are predicted to be available. For example, a user 206 may check a user interface 224 such as a dashboard for better query timings for queries that source from the marked sources. In some embodiments, if a query is being performed during the time where one or more time-limited sources are not available, a processor may send a notification to the user to that fetching data from one or more sources may be delayed or time-out, and/or send a recommendation to adjust the query time. In some embodiments, a processor may specify in such a recommendation that if the query time is moved to another time (e.g., by 1 hour), X more records can be fetched. A dashboard functionality or like user interface 224 may provide administrators or users, visual view regarding which time may allow for fetching from more sources and receiving more reliable data and accurate results.

In some embodiments, a processor also may make read adjustments in distributed queries, for example, from being parallel to sequential. For example, parallel reads or fetches can be adjusted to sequential fetches, based on data source availability at the time. While parallelism can result in faster results, if some sources time-out during fetches, a retry may kick in where the entire query is retried. In some embodiments, a processor can check whether N sources will be available if some delay between multiple fetches in the distributed query (e.g., 10 seconds or 1 minute delayed). If so, some of the sources which may not be available can be accessed after that delay. The results of the different parts of the distributed query can be joined after all data is fetched (e.g., after 10 seconds or 1 minute). For example, in such cases in some embodiments, a processor runs parts of the distributed query on all available sources first and then sequentially runs other parts of the distributed query on the sources which may be available later, e.g., in a 10 second or 1 minute delay. While such sequential runs or fetches may slow down a distributed query, e.g., 10 second or 1 minute delay, no retries and/or time-outs would occur for the user of a query management system or engine described herein.

Figure 3:
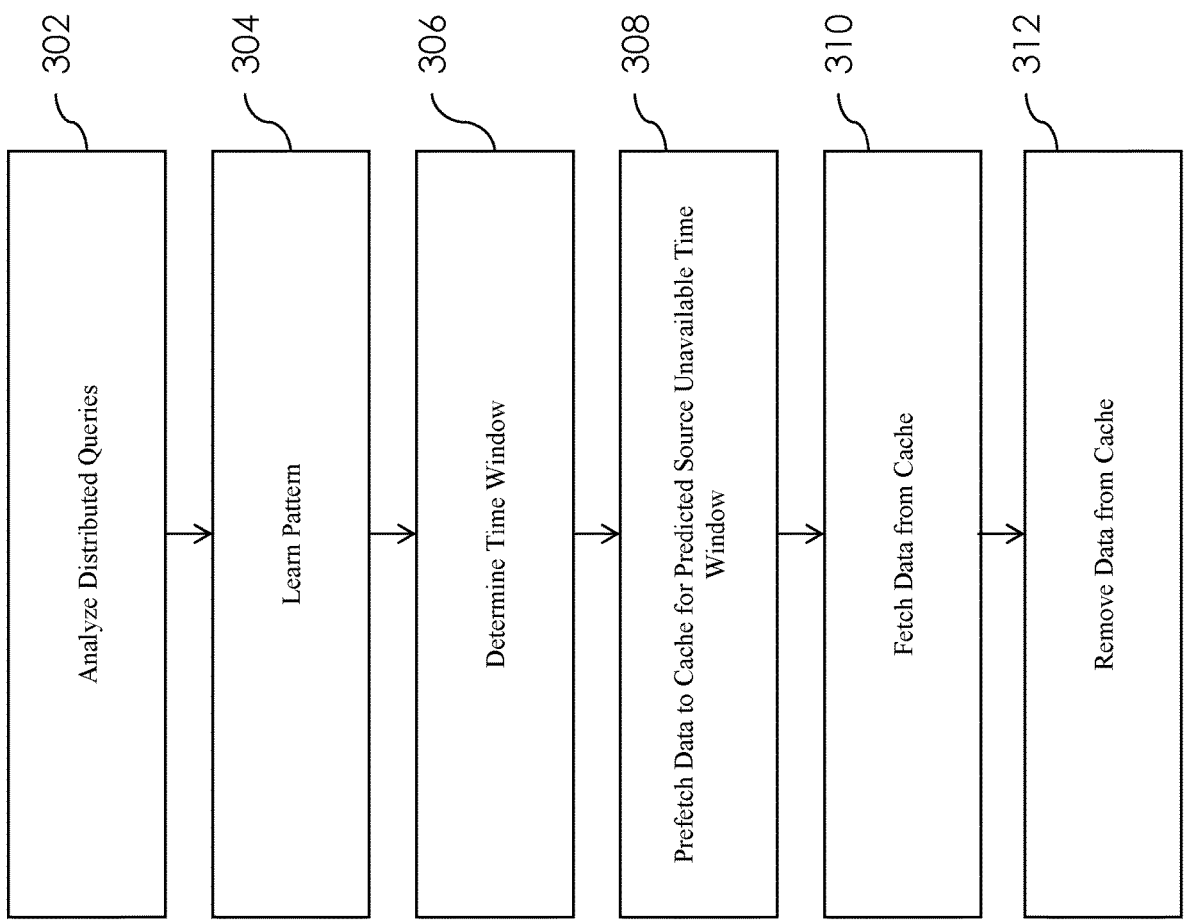
FIG. 3 is a flow diagram illustrating a method of managing distributed queries in some embodiments.

FIG. 3 is a flow diagram illustrating a method of managing distributed queries in some embodiments. The method can be implemented or run on one or more computer processors, for example, in a computing environment shown with reference to FIG. 1. In some embodiments, the method can be part of a query engine mechanism employed in lakehouse architecture, e.g., a system that provides and/or manages data storage, e.g., data lakes, data warehouses, and/or another storage management that stores volumes of structured and/or raw data. At 302, distributed queries received from users are analyzed to identify repeated queries. For example, using historical examples of distributed queries received by a lakehouse or like storage management system (e.g., a query engine or query function of such a system), queries that repeat a threshold number of times are identified as repeated queries.

At 304, a pattern of the repeated queries is learned. For example, the pattern of the repeated queries such as availability of data sources needed or used for responding to those repeated queries and response time of each source, in providing the data for responding to the query can be learned.

In some embodiments, processing at 306, 308, 310 and 312 are performed for all data sources, for example, for each of the data sources, which exhibit slow response time (e.g., determined by a threshold criterion). For example, for a data source in the data sources, processing at 306, 308, 310 and 312 are performed.

At 306, a window of time (also referred to as a time window) is determined during which the data source has a response time that is slower than a threshold time (also referred to as a response time criterion). This time window is also referred to as a predicted source unavailable time window.

At 308, prior to the beginning of the time window, data is prefetched from the data source and stored in a cache storage. For example, a processor may prefetch data for predicted source unavailable time window, from that data source to a storage device used as cache, prior to the time that is covered in the time window.

At 310, in response to receiving a distributed query during the time window, the data is fetched from the cache storage, e.g., instead of from the data source, e.g., since that data source is determined to have slow response time during this time.

At 312, after the end of the time window, the data is removed from the cache storage.

In some embodiments, a processor can keep records of timed-out data sources from repeated queries. Also, a processor can keep records of queries that are slower than other queries. For example, a predefined threshold or criterion can be used to determine whether queries are slower than other queries. An example threshold or criterion to determine whether queries are slow or slower than other queries is a percentage-based threshold or criterion, for example, slower than 80% of total queries.

In some embodiments, based on reinforced learning, a processor can determine and provide one or more causes, e.g., that slower queries are due to a network delay or due to the size of data, e.g., by correlating delay and data size with other queries. For instance, a processor may analyze time taken for 1 gigabyte (GB) data across queries. If 1 GB data query takes 2 seconds to get result as average across all queries, and then 500 megabyte (MB) data takes 2 seconds in one query, this one query is slower than average due to network throughput dimension. A processor may also learn the comparison of time responses for queries with same data volume and correct the correlation. For example, if the correlation is not a linear relationship with previous data size to time, the data source can be considered slower than others (not due to network delay).

In some embodiments, a processor taps into regular availability checks of sources as well as the heartbeat kind of verification. For instance, a processor may check periodically, e.g., every periodic time interval (which can be predefined), the availability of data sources and their response times. Heartbeat is a known technique that can be used to check a service status of a sources (e.g., data sources).

In some embodiments, from continuous learning, a processor identifies a set of queries that are slowed down or blocking regularly due to the sources (e.g., repeatedly) and the kind of query that is hitting these sources. For example, a processor may compare time responses for queries with same data volume and use the combined time responses (such as average among the queries) to learn a correlation. For example, if the correlation is not a linear relationship with previous data size to time, the data source can be considered slower than others.

In some embodiments, a processor identifies a list of sources which affects N number of queries, where N can be set as a threshold. The list of sources has information about which time window the data source is unavailable or slow, e.g., few hours in a day or day of the week, etc. For example, a processor may keep an average response time of all sources, and if a source's response time goes below this average at certain time, e.g., on Sundays, the processor identifies this certain time, e.g., Sundays, as the time window. For example, from historical data, a processor analyzes the response times of the sources and identifies the time windows during which those sources have response times that are considered slow, e.g., slower than a predefined threshold (also referred to as a response time criterion).

In that way, a processor can prepare the most impacted time window for all regular and predicted queries that are hitting a source in above list of sources. Based on the identified most impacted time window of a source, a processor prefetches the data from that source before the time of the time window (e.g., prior to the beginning time of the time window) and saves or stores the prefetched data in a cache storage, which acts as a representative of the source during the time period of the time window.

If a query hits during the times of the time windows for the list of sources, a processor fetches data from the cache storage. For example, responsive to receiving a distributed query that uses a data source during a time window of that data source, a processor fetches data from the cache storage, where at least a part of a response to the distributed query is sourced from the cache storage.

In some embodiments, a processor cleans the cache after the time window. For example, after the end time of the time window, a processor removes or deletes the data from the cache storage.

In some embodiments, the time window or most impacted window of time determined for each source can be updated or corrected. For example, based on availability checks and/or any new queries that are hitting a source during the time of the time window, which is successfully yielding the results in an acceptable time or speed, a processor may reset or update the time window as no longer being impacted. For example, a processor may shorten the time window, lengthen the time window, change the time window, based on availability checks and response times to new queries. In this way, availability or unavailability times can be kept up-to-date, where a query engine can access a given source according to the updated times when the source is busy or not busy.

In some embodiments, users such as administrators can be allowed to set a threshold for source availability to mark data sources as time limited. An example of such threshold can be that a source is marked as available if certain percentage of queries (e.g., 90% of predicted queries) receive responses within an acceptable response time. Once set, for all queries, such sources are used during the time limited period in which they are predicted to be available.

In some embodiments, based on the number of queries hitting on one or more time limited data sources (e.g., if the number of queries exceeds a predefined number of queries), a processor can send a notification to users, that one or more sources may not be available and also can send a recommendation to adjust the query time. In some embodiments, a dashboard can be provided which can give administrators or usuals a visual view as to which time may allow more sources and more reliable data and accurate results.

In some embodiments, where all parts of a distributed query is performed in parallel, and where some sources affecting some parts of the distributed query time out, multiple retries may kick-in. In some embodiments, a processor can check whether those sources will become available, if a delay is taken (e.g., 10 secs or 1 min delayed). The timing of the delay (e.g., 10 seconds or 1 minute delay) can be predefined. In such cases, a processor may delay performing some parts of the distributed query until the sources become available, and join the results of all parts of the distributed once all responses have been received. For example, a processor will execute all available sources first and then sequentially execute the sources which may be available in a 10 second or 1 minute delay. The delay can be till nearest time limited available time. In such a way, a parallel query can be transformed to a sequential query, where retries of the query can be mitigated or avoided. In this way also, computing resources incurred during multiple retries can be saved.

Figure 4:
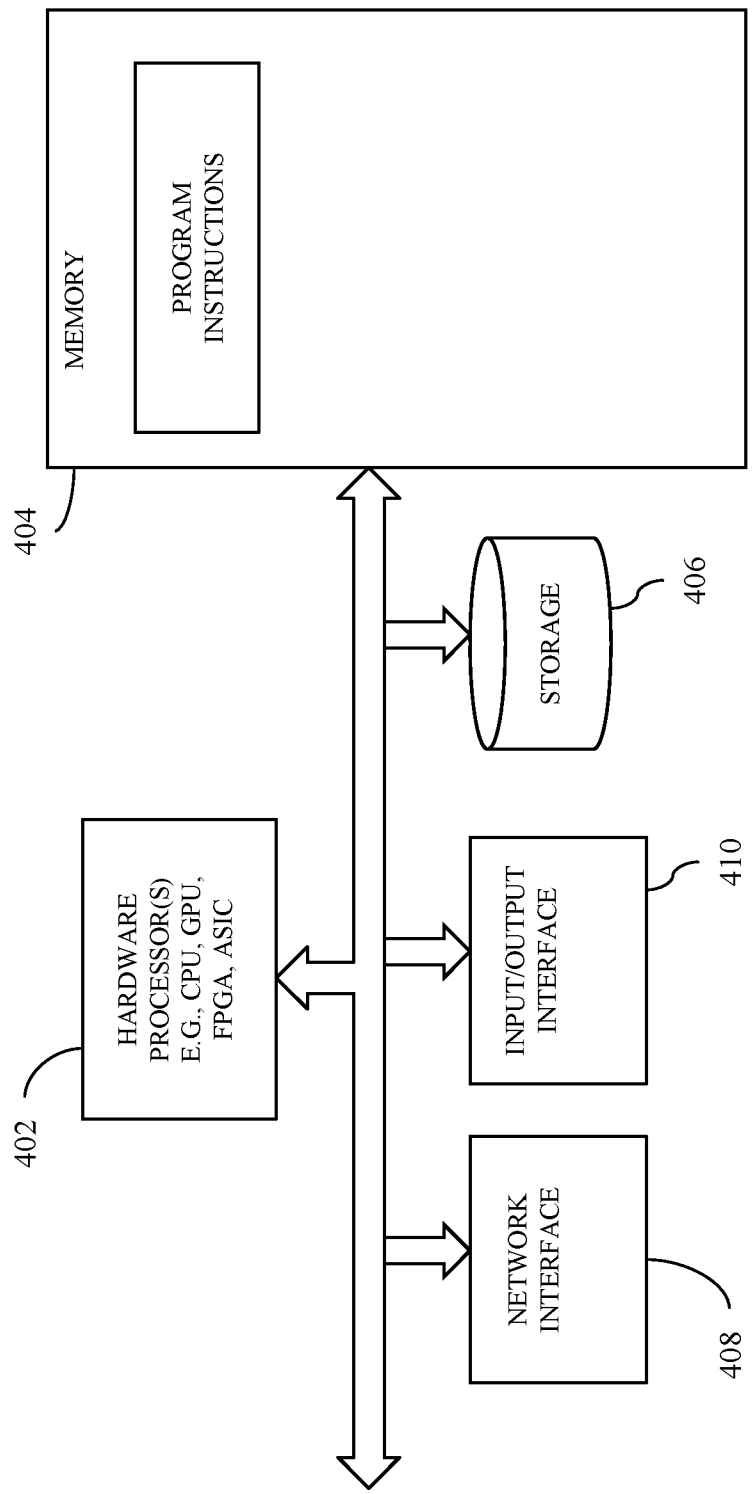
FIG. 4 is a diagram showing components of a system in one embodiment that performs distributed query optimization.

FIG. 4 is a diagram showing components of a system in one embodiment that performs distributed query optimization. One or more hardware processors 402 such as a central processing unit (CPU), a graphic process unit (GPU), and/or a Field Programmable Gate Array (FPGA), an application specific integrated circuit (ASIC), and/or another processor, may be coupled with a memory device 404, and perform distributed query optimization. A memory device 404 may include random access memory (RAM), read-only memory (ROM) or another memory device, and may store data and/or processor instructions for implementing various functionalities associated with the methods and/or systems described herein. One or more processors 402 may execute computer instructions stored in memory 404 or received from another computer device or medium. A memory device 404 may, for example, store instructions and/or data for functioning of one or more hardware processors 402, and may include an operating system and other program of instructions and/or data. One or more hardware processors 402 may receive distributed queries. For instance, at least one hardware processor 402 may analyze distributed queries to identify repeated queries. At least one hardware processor may learn a pattern of the repeated queries, the pattern providing information associated with at least availability of data sources used for responding to the repeated queries and response times of the data sources. For a data source in the data sources, at least one hardware processor 402 may perform the following: determine a time window during which the data source has a response time that is slower than a response time criterion; prior to beginning of the time window, prefetch data from the data source and storing the data in a cache storage; responsive to receiving a distributed query that uses the data source during the time window, fetch the data from the cache storage, where at least a part of a response to the distributed query is sourced from the cache storage; and after end of the time window, remove the data from the cache storage. Data may be stored in a storage device 406 or received via a network interface 408 from a remote device, and may be temporarily loaded into a memory device 404 for functioning of one or more hardware processors 402. One or more hardware processors 402 may be coupled with interface devices such as a network interface 408 for communicating with remote systems, for example, via a network, and an input/output interface 410 for communicating with input and/or output devices such as a keyboard, mouse, display, and/or others.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in some embodiments" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
analyzing distributed queries to identify repeated queries;
learning a pattern of the repeated queries, the pattern providing information associated with at least availability of data sources used for responding to the repeated queries and response times of the data sources;
for a data source in the data sources,
determining based on the pattern providing information associated with the availability and the response times of the data source, a time window during which the data source has a response time that is slower than a response time criterion;
prior to beginning of the time window, prefetching data from the data source and storing the data in a cache storage;
responsive to receiving a distributed query that uses the data source during the time window, fetching the data from the cache storage, wherein at least a part of a response to the distributed query is sourced from the cache storage;
after end of the time window, removing the data from the cache storage; and
transforming a parallel distributed query into a sequential distributed query by adjusting read times of the data sources based on the availability of data sources and the response times of the data sources, the adjusting of the read times delaying reading of at least some of the data sources.

2. The computer-implemented method of claim 1, wherein the determining of the time window, the prefetching of the data, the fetching of the data, and the removing of the data are performed for all of the data sources.

3. The computer-implemented method of claim 1, further including updating the time window based on new distributed queries.

4. The computer-implemented method of claim 1, further including updating the time window based on periodic availability checks of the data source.

5. The computer-implemented method of claim 1, further including providing a user interface via which the data source can be marked as being time limited, wherein responsive to receiving a distributed query that uses the data source, sending a notification to a submitter of the distributed query to adjust a time of query submission.

6. The computer-implemented method of claim 1, wherein responses to all parts of the distributed query are joined after the responses are received.

7. The computer-implemented method of claim 1, further including providing a reason for the response time of the data source.

8. A computer program product comprising a computer readable storage medium having program instructions embodied therewith, the program instructions readable by a device to cause the device to:
analyze distributed queries to identify repeated queries;
learn a pattern of the repeated queries, the pattern providing information associated with at least availability of data sources used for responding to the repeated queries and response times of the data sources;
for a data source in the data sources,
determine based on the pattern providing information associated with the availability and the response times of the data source, a time window during which the data source has a response time that is slower than a response time criterion;
prior to beginning of the time window, prefetch data from the data source and storing the data in a cache storage;
responsive to receiving a distributed query that uses the data source during the time window, fetch the data from the cache storage, wherein at least a part of a response to the distributed query is sourced from the cache storage; and
After end of the time window, remove the data from the cache storage; and
transform a parallel distributed query into a sequential distributed query by adjusting read times of the data sources based on the availability of data sources and the response times of the data sources, the adjusting of the read times delaying reading of at least some of the data sources.

9. The computer program product of claim 8, wherein the device is caused to determine the time window, prefetch the data, fetch the data, and remove the data, for all of the data sources.

10. The computer program product of claim 8, wherein the device is further caused to update the time window based on new distributed queries.

11. The computer program product of claim 8, wherein the device is further caused to update the time window based on periodic availability checks of the data source.

12. The computer program product of claim 8, wherein the device is further caused to provide a user interface via which the data source can be marked as being time limited, wherein responsive to receiving a distributed query that uses the data source, the device is further caused to send a notification to a submitter of the distributed query to adjust a time of query submission.

13. The computer program product of claim 8, wherein responses to all parts of the distributed query are joined after the responses are received.

14. The computer program product of claim 8, wherein the device is further caused to provide a reason for the response time of the data source.

15. A system comprising:
at least one computer processor;
at least one memory device coupled with the at least one computer processor;
the at least one computer processor configured to at least:
analyze distributed queries to identify repeated queries;
learn a pattern of the repeated queries, the pattern providing information associated with at least availability of data sources used for responding to the repeated queries and response times of the data sources;
for a data source in the data sources,
determine based on the pattern providing information associated with the availability and the response times of the data source, a time window during which the data source has a response time that is slower than a response time criterion;
prior to beginning of the time window, prefetch data from the data source and storing the data in a cache storage;
responsive to receiving a distributed query that uses the data source during the time window, fetch the data from the cache storage, wherein at least a part of a response to the distributed query is sourced from the cache storage; and
after end of the time window, remove the data from the cache storage;
transform a parallel distributed query into a sequential distributed query by adjusting read times of the data sources based on the availability of data sources and the response times of the data sources, the adjusting of the read times delaying reading of at least some of the data sources.

16. The system of claim 15, wherein the computer processor is configured to determine the time window, prefetch the data, fetch the data, and remove the data, for all of the data sources.

17. The system of claim 15, wherein the computer processor is further configured to update the time window based on new distributed queries.

18. The system of claim 15, wherein the computer processor is further configured to update the time window based on periodic availability checks of the data source.

19. The system of claim 15, wherein the computer processor is further configured to provide a user interface via which the data source can be marked as being time limited, wherein responsive to receiving a distributed query that uses the data source, the computer processor is further configured to send a notification to a submitter of the distributed query to adjust a time of query submission.

20. The system of claim 15, wherein responses to all parts of the distributed query are joined after the responses are received.

* * * * *